United States Patent [19]
Grathoff et al.

[11] Patent Number: 5,152,583
[45] Date of Patent: Oct. 6, 1992

[54] CONTINUOUS-OPERATION EXTRACTION MACHINERY FOR STRIP MINING WITH A CYLINDRICAL EXTRACTOR

[75] Inventors: Hartmut Grathoff, Wendelstein; Peter Kurz, Nürnberg, both of Fed. Rep. of Germany

[73] Assignee: MAN Gutehoffnungshütte AG, Oberhausen, Fed. Rep. of Germany

[21] Appl. No.: 698,833

[22] Filed: May 10, 1991

[30] Foreign Application Priority Data

May 11, 1990 [DE] Fed. Rep. of Germany ....... 4015126

[51] Int. Cl.$^5$ .............................................. E21C 47/04
[52] U.S. Cl. .......................................... 299/39; 37/97; 37/190; 299/67
[58] Field of Search ....................... 299/36, 39, 64, 67, 299/18; 37/83, 85, 86, 90, 97, 190, 191 R, 191 A, 192 R, 192 A, 107; 198/508, 509, 518

[56] References Cited
U.S. PATENT DOCUMENTS 3,049,823  8/1962  Spalding ........................ 299/67 X
4,362,237  12/1982  Olsztynski et al. ............... 37/190 X
4,430,812  2/1984  Van der Ent ................. 37/191 A X Primary Examiner—David J. Bagnell
Attorney, Agent, or Firm—Max Fogiel

[57] ABSTRACT

A continuous-operation extraction apparatus for strip mining that is self propelled on continuous track treads. A cylindrically-shaped cutting extractor has cutting tools arranged on its peripheral surface. Recesses are provided in this peripheral surface for the transfer of extracted material through a chute to a first conveyor that is located axially within the cylinder of the cutting extractor. A second conveyor having loading carts connects with the first conveyor and receives the loosened material from the first conveyor. The first conveyor has an inside section which emerges from a front side of the cylinder and merges outside into a sloping conveyance section which extends vertically to substantially an upper edge of a chassis. An overhead ascending section is connected to the inside section and terminates in a transfer region where the extracted material is transferred to the second conveyor.

7 Claims, 1 Drawing Sheet

CONTINUOUS-OPERATION EXTRACTION MACHINERY FOR STRIP MINING WITH A CYLINDRICAL EXTRACTOR

BACKGROUND OF THE INVENTION

The invention concerns continuous-operation extraction machinery for strip mining that travels under its own power on continuous track treads and includes a cylindrical extractor with blades distributed around it, whereby the extracted material is transferred through a chute to a conveyor belt positioned axially inside the cylinder.

Surface cutters for roadway traces or integuments are known. They have small-diameter abrading cylinders, travel on continuous track treads, and fling the extracted material through a hopper and onto an intermediate belt between the treads at the back of the vehicle. The intermediate belt transfers the material onto a belt that can be pivoted over a truck.

Strip-mining machinery that operates in accordance with what is called the Scatterwhite method is known. Four adjacent overhead bucket wheels are mounted in front and fling the extracted material onto two transverse belts behind them. The transverse belts transfer it to an intermediate belt that travels in a direction opposite that of the vehicle and merges into a catapulting belt that can be pivoted over a truck.

Strip-mining machinery of the foregoing species is described in the as yet unpublished German patent application no. P 3 920 011.6. The material extracted by the abrading cylinder in this equipment is flung out to the front by a belt inside the cylinder. The belt flings it onto a bridging belt that is universally articulated to it. The expulsion end of the bridging band is itself universally articulated to a hopper car. The material drops down through the hopper and onto a face belt. The strip-mining equipment described in P 3 920 011.6 has, to the extent that it addresses the concept of the extractor itself, the abrading cylinder, that is, a wide range of applications. The constellation of conveying mechanisms as for example, bridging belt, face belt, etc. described in that document, however, cannot be employed in individual cases, when for example local strip-mining conditions do not allow the belts to be erected as described.

SUMMARY OF THE INVENTION

The object of the invention is to improve the extraction machinery for strip mining described in the unpublished German application to the extent that it can be employed for many purposes.

It is of particular advantage for the disposal conveyor to be an undulating-edge strand belt or corrugated side wall belt with transverse grousers that rests against a stripper-strand belt in the sloping-conveyance section and in the adjacent ascending section above the chassis of the extracting machinery. The corrugated side wall belt may be in the form of a rubber conveying belt that is produced commercially by Conrad Scholz AG in Germany, for example.

Instead of an undulating-edge strand belt and of the aforesaid stripper-strand belt, it is possible to employ a disposal conveyor comprising a conventional troughed conveying-strand belt with a stripper-strand belt in the perpendicular and sloping ascending sections. The troughed conveying-strand belt and the stripper-strand belt are in a way that is in itself known forced together by spring-loaded supporting rollers. The two strand belts can alternatively be forced together in a known way by aiming compressed air against their rear surfaces. In this event the belts will be encapsulated in a box.

What is called a foam belt can be employed instead of the stripper-strand belt. A foam belt for this purpose is shown, for example, in German Pat. No. 22 36 102.

The grouser belt and the loader car in the extracting machinery in accordance with the invention rest against the rim of the block being degraded both while the decomposition pit is being dug and while the blocs are being harvested. The grouser belt and strand belts that extend out of it are on the same level and will not need to be routed over a strip-mining acclivity at any point.

One particular advantage is that unimpeded-incision conditions prevail at the face of the abrading cylinder where the disposal belt extends up out of it in the capacity of a sloping conveyor and allow the creation of sloping strip-mine demarcating acclivities.

BRIEF DESCRIPTION OF THE DRAWINGS

One embodiment of the invention will no be described with reference to the schematic drawing, wherein.

DESCRIPTION OF THE PREFERRED EMBODIMENTS

Figure 1:
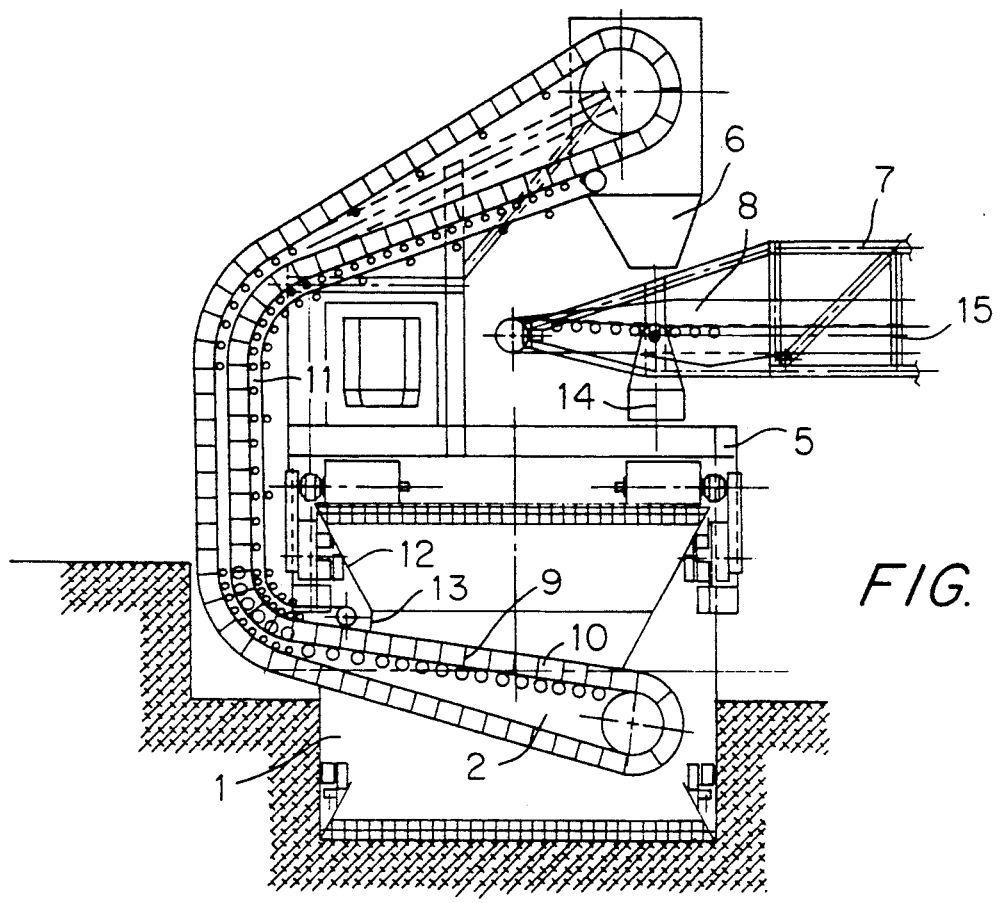
FIG. 1 is a section through the extracting machinery and FIG. 2 is a side view of the extracting machinery with a spanning bridge and a loader car in a strip mine.
Figure 2:
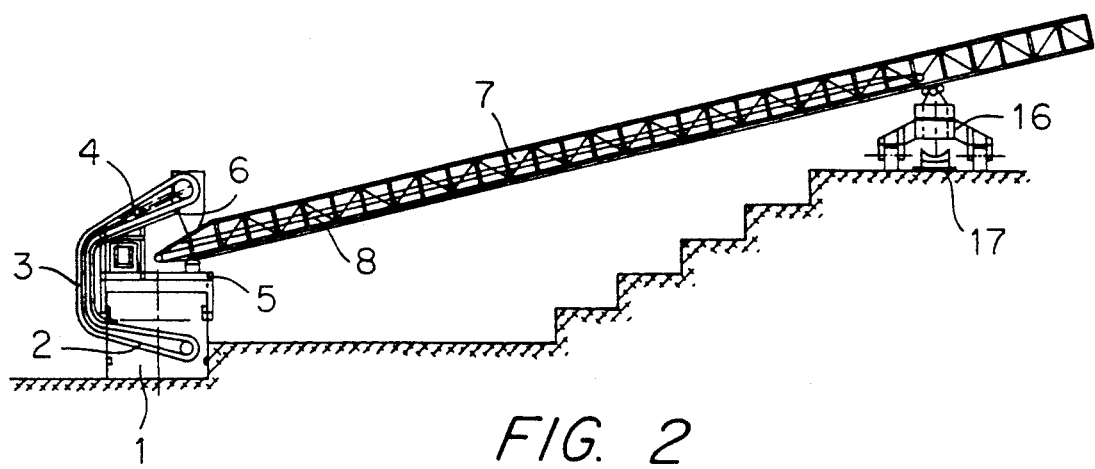

Extracting machinery for a strip mine preferably travels on unillustrated caterpillar treads, with an individually powered pair in front of and behind an abrading cylinder 1. The front and rear pairs of treads can be independently elevated and depressed on hydraulic operated parallelograms.

The overall design of the extracting machinery and cylinder, consisting of rip-out beams with teeth mounted in holders that tilt up and down on them, is described and illustrated in detail in German application No. 3 920 011.6.

The material abraded off by the rip-out teeth is flung by the beam and its take-along baffle as they revolve around a stationary disposal hopper 12 into the cylinder and there onto a disposal conveyor 2, 3, and 4.

The disposal conveyor is a continuous conveyor with three sections. First section 2 is inside abrading cylinder 1 and emerges from it axially. Second section 3 extends in the capacity of a vertical conveyor to approximately the level of the upper edge of the chassis 5 of the extracting machinery. The disposal conveyor continues in the capacity of a slightly ascending section 4 to a transfer point 6 above chassis 5.

The present embodiment of disposal conveyor 2, 3, and 4 is an undulating-edge strand belt with transverse grousers 9 on approximately the same level as its edges 10. Disposal conveyor 2, 3, and 4 has, beginning laterally with reference to the direction of conveyance and below the hopper 12 associated with abrading cylinder 1 and ending at transfer point 6 above chassis 5, a stripper-strand belt 11, which the section of the undulating-edge strand belt that is loaded with extracted material rests on.

Transfer point 6 accommodates an enhousement for the catapulting head of disposal conveyor 2, 3, and 4 with a catapulting cone below it.

Positioned at the outlet of hopper 12 inside abrading cylinder 1 is a skimmer 13. The skimmer demarcates the maximum load level as dictated in terms of disposal conveyor 2, 3, and 4 by the height of edges 10 and transverse grousers 9.

The material extracted by abrading cylinder 1 is catapulted at the head of the terminating section 4 of the disposal conveyor in transfer point 6 onto a conveyor 8 accommodated in a spanning bridge 7. Conveyor 8 is usually a strand-belt conveyor.

Spanning bridge 7 is mounted on the chassis 5 of the extracting machinery and can pivot freely around its vertical axis 14 and around a horizontal axis 15 perpendicular to the longitudinal axis of the bridge.

The end of spanning bridge 7 opposite transfer point 6 is mounted on a loader car 16, which can have continuous track treads for example. The bridge swings freely in three dimensions on the car and can be displaced along its longitudinal axis.

Below loader car 16 is a grouser belt 17 in the form of a strand-belt conveyor.

We claim:

1. A continuous-operation extraction apparatus for strip mining that is self-propelled on continuous track treads, comprising: a cylindrically-shaped cutting extractor having a peripheral surface; cutting tools arranged on said peripheral surface; said peripheral surface having recesses for transfer of extracted material through a chute to a first conveyor located axially within said cylindrically-shaped cutting extractor; a second conveyor with loading carts connecting with said first conveyor for receiving said material from said first conveyor; a chassis with an upper edge; said first conveyor being an endless conveyor having an inside section emerging from a front side of said cylindrically-shaped cutting extractor and merging outside thereof into a sloping conveyance section extending vertically to substantially said upper edge of said chassis; an ascending overhead section connected to said inside section and terminating in a transfer region where the extracted material is transferred to said second conveyor; said second conveyor comprising a bridging conveyor held within a connecting bridge; a smooth planar covering belt for covering said first conveyor; said belt beginning at an end of said inside section within said cylindrically-shaped cutting extractor and ending at said transfer region.

2. A continuous-operation extraction apparatus as defined in claim 1, wherein said first conveyor comprises an undulating-edge strand belt with transverse grousers having a height substantially equal to the height of edges of said undulating-edge strand belt, said undulating-edge strand belt having a portion carrying said extracted material and supported by said covering belt.

3. A continuous-operation extraction apparatus as defined in claim 1, wherein said first conveyor comprises a troughed conveying-strand belt; spring-loaded supporting rollers for pressing together said trough conveying strand belt and said covering belt.

4. A continuous-operation extraction apparatus as defined in claim 1, wherein said first conveyor comprises a troughed conveying strand belt; and means applying pressure to the back sides of said troughed conveying strand belt and said covering belt for pressing together said troughed conveying strand belt and said covering belt.

5. A continuous-operation extraction apparatus as defined in claim 1, wherein said chute has an outlet on said first conveyor; skimmer means at said outlet on said first conveyor means for limiting a filling height.

6. A continuous-operation extraction apparatus for strip mining that is self-propelled on continuous track treads, comprising: a cylindrically-shaped cutting extractor having a peripheral surface; cutting tools arranged on said peripheral surface; said peripheral surface having recesses for transfer of extracted material through a chute to a first conveyor located axially within said cylindrically-shaped cutting extractor; a second conveyor with loading carts connecting with said first conveyor for receiving said material from said first conveyor; a chassis with an upper edge; said first conveyor being an endless conveyor having an inside section emerging from a front side of said cylindrically-shaped cutting extractor and merging outside thereof into a sloping conveyance section extending vertically to substantially said upper edge of said chassis; an ascending overhead section connected to said inside section and terminating in a transfer region where the extracted material is transferred to said second conveyor; said second conveyor comprising a bridging conveyor held within a connecting bridge; a smooth planar covering belt for covering said first conveyor; said belt beginning at an end of said inside section within said cylindrically-shaped cutting extractor and ending at said transfer region; said chute having an outlet on said first conveyor; skimmer means at said outlet on said first conveyor for demarcating a maximum load level dependent on the height of edges of said first conveyor.

7. A continuous-operation extraction apparatus for strip mining that is self-propelled on continuous track treads, comprising: a cylindrically-shaped cutting extractor having a peripheral surface; cutting tools arranged on said peripheral surface; said peripheral surface having recesses for transfer of extracted material through a chute to a first conveyor located axially within said cylindrically-shaped cutting extractor; a second conveyor with loading carts connecting with said first conveyor for receiving said material from said first conveyor; a chassis with an upper edge; said first conveyor being an endless conveyor having an inside section emerging from a front side of said cylindrically-shaped cutting extractor and merging outside thereof into a sloping conveyance section extending vertically to substantially said upper edge of said chassis; an ascending overhead section connected to said inside section and terminating in a transfer region where the extracted material is transferred to said second conveyor; said second conveyor comprising a bridging conveyor held within a connecting bridge; a smooth planar covering belt for covering said first conveyor; said belt beginning at an end of said inside section within said cylindrically-shaped cutting extractor and ending at said transfer region; said connecting bridge being mounted on said chassis and being pivotable freely about a vertical axis of said connecting bridge and is pivotable freely also about a horizontal axis perpendicular to a longitudinal axis of said bridge, said connecting bridge having an end mounted on one of said loading cars and swinging freely in three dimensions on said car and being displaceable along said longitudinal axis of said bridge.

* * * * *